(12) United States Patent  
Wakou et al.

(10) Patent No.: US 7,063,367 B2
(45) Date of Patent: Jun. 20, 2006

(54) POCKET STRUCTURE IN SLIDE DOOR

(75) Inventors: Taku Wakou, Kanagawa (JP); Satoru Nagamoto, Wako (JP)

(73) Assignees: Kasai Kogyo Co., Ltd., Kanagawa-ken (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/216,834

(22) Filed: Aug. 31, 2005

(65) Prior Publication Data

US 2006/0049653 A1     Mar. 9, 2006

(30) Foreign Application Priority Data

Sep. 6, 2004   (JP)   ............................. P2004-258281

(51) Int. Cl.
*B60N 3/12*        (2006.01)

(52) U.S. Cl. ..................... 296/37.13; 296/152; 224/544

(58) Field of Classification Search ............... 296/37.8, 296/37.13, 152; 224/539, 543, 544
See application file for complete search history.

(56) References Cited

U.S. PATENT DOCUMENTS

| | | | | | |
|---|---|---|---|---|---|
| 5,261,716 | A | * | 11/1993 | Phelps ....................... | 296/37.8 |
| 5,499,853 | A | * | 3/1996 | Pourian ................... | 296/37.13 |
| 5,535,571 | A | * | 7/1996 | Nichols ..................... | 52/716.6 |
| D382,528 | S | * | 8/1997 | Hellhake et al. ........... | D12/195 |
| D387,024 | S | * | 12/1997 | Hellhake et al. ........... | D12/195 |
| 5,800,004 | A | * | 9/1998 | Ackeret .................... | 296/37.13 |
| 6,073,984 | A | * | 6/2000 | Chaloult et al. ......... | 296/37.13 |
| 6,120,077 | A | * | 9/2000 | Westphal et al. ........ | 296/37.13 |
| 6,328,191 | B1 | * | 12/2001 | Conley et al. .............. | 224/563 |
| 6,682,115 | B1 | * | 1/2004 | Tiesler ...................... | 296/37.1 |

FOREIGN PATENT DOCUMENTS

JP       2000-355248        12/2000

* cited by examiner

*Primary Examiner*—Lori L. Coletta
(74) *Attorney, Agent, or Firm*—Norris McLaughlin & Marcus PA

(57) ABSTRACT

A pocket structure which is a door pocket provided at a slide door in a van type vehicle, and which makes it possible to facilitate removal of small articles and makes it possible to reliably store large-sized books and the like is provided.

A pocket opening 21 is provided in a lining body 20 in a door lining 10 mounted on an indoor surface of a slide door 2, a pocket back cover 30 is mounted to their rear surface sides to construct a door pocket P, a large depth space at a lower portion of the door pocket P is secured, and a guiding inclined surface 34, a guiding curved surface 35, a guiding rib 36 or the like is provided at a back side of a bottom surface portion of the door pocket P, whereby large-sized books M are guided and stored in a substantially vertical state, and thereby, interference with a door outer plate at a time of operation of the slide door 2 is avoided.

3 Claims, 4 Drawing Sheets

PRIOR ART

POCKET STRUCTURE IN SLIDE DOOR

BACKGROUND OF THE INVENTION

1. Field of the Invention

The present invention relates to a pocket structure in a slide door, and particularly relates to a pocket structure in a slide door which is enhanced in usability without hindrance in a sliding action of the slide door by making it possible to facilitate an operation of removing small articles stored in a pocket and by making it possible to store books such as a road map, a magazine and the like in suitable postures.

2. Description of the Related Art

FIG. 6 shows a van type vehicle 1, and in this kind of van type vehicle 1, a slide door 2 tends to be frequently used so as to be able to be opened and closed even in a small space. A door lining 3 shown in FIG. 7 is mounted to an indoor surface of the slide door 2, and the door lining 3 is formed its shape to be a substantially flat shape so that a product surface of the door lining 3 does not project to the indoor side so that the slide door 2 including the door lining 3 does not interferer with an outer plate of the vehicle 1 when the slide door 2 is operated to open.

The door lining 3 is normally constructed by an injection-molded body of a synthetic resin, or a mold-press formed body, and a door pocket 4 capable of storing fixtures is provided at a lower portion side of the door lining 3. As the door pocket 4, the door pocket 4, which is provided with a pocket opening 5 and a small articles removing window part 6 in the door lining 3, and is mounted with a pocket back cover 7 constituted of an injection-molded body of a synthetic resin on a rear surface side of the pocket opening 5 and the small articles removing window part 6 to have a desired pocket space as shown in FIG. 8. As for the prior art example of a construction of the door lining 3 and the door pocket 4 in the slide door 2 is shown in Japanese Patent Application Laid-Open No. 2000-355248

A pocket portion of the door lining 3 cannot be projected to the indoor side because interference with a vehicle body outer plate has to be avoided at the time of slide operation of the slide door 2, and therefore, the construction of the door pocket 4 of the slide door 2 in the conventional van type vehicle 1 is small in the depth dimension, and tends to be set to be deep in a vertical direction. Therefore, as shown in FIG. 8, in order to remove small articles stored in a bottom portion of the door pocket 4, the small articles removing window part 6 is set.

However, even if fingers are inserted through the small articles removing window part 6 to try to remove the small articles, removal easiness of small articles is low because the depth dimension of the door pocket 4 is small, and improvement in usability is desired. Since the depth space of the door pocket 4 is small, a cleaning operation of the door pocket 4 actually has to be a troublesome operation.

SUMMARY OF THE INVENTION

The present invention is made in view of the above circumstances, and an object of the present invention is to provide a pocket structure of a slide door in a van type vehicle and the like, and particularly, a pocket structure in a slide door which makes it possible to facilitate a removing operation of small articles and the like and a cleaning operation of an inside of a pocket, and is capable of storing books such as a road map, a magazine and the like in proper postures.

In order to achieve the above-described object, in a pocket structure in a slide door for a vehicle essentially consisting of a door lining which is mounted to an indoor surface side of a slide door, said door lining including a lining main body and being formed to be substantially flat so as to avoid interference with a vehicle body panel at a time of a slide operation of the slide door; a door pocket which is provided with a pocket opening at the lining main body; and a pocket back cover which is mounted to a rear surface side of the pocket opening, a bottom of said door pocket is provided with a guide structure, said guide structure being inclined downward to the direction of the inside of a vehicle so as to store books in the door pocket in substantially vertical posture; and a lower part of said pocket back cover is formed to bulge to a vehicle body panel side so as to secure a space of a lower portion of the door pocket to be large.

Here, the door lining is constructed by assembling attachment such as an inside handle, a door glass opening and closing mechanism, a door pocket and the like to the lining body formed into a substantially flat shape by an injection-molded body of a synthetic resin, a mold-press formed body or the like.

As the door pocket, the door pocket is constructed by providing a pocket opening in the door lining main body, and by assembling the three-dimensional pocket back cover constituted of an injection-molded body of a synthetic resin to the rear surface side of the pocket opening by ultrasonic welding, fastening with a screw or the like. Besides, in consideration of taking in and out small articles, it is preferable to provide a small articles removing window part below the pocket opening.

The pocket back cover constituted by the injection-molded body of a synthetic resin is set to be long in the depth dimension of the substantially lower half portion so that the substantially lower half portion bulges to the vehicle body panel side in order to secure a pocket capacity to be large.

Incidentally, since the depth dimension of the pocket opening is comparatively small, and the depth dimension of the bottom wall of the pocket is long, the books such as a road map, a magazine and the like tend to tilt inside when the books such as a road map, a magazine and the like are stored in the pocket. Thus, in the present invention, in order to prevent the books from tilting inside, a guide structure is provided at a bottom portion of the door pocket.

As the guide structure, the construction in which the shape of the bottom wall of the pocket back cover is set to be an inclined surface which becomes downward inclination to the direction of the inside of a vehicle from the rear wall to the bottom wall, or a curved surface, and the inclined surface, or the curved surface is made a guiding inclined surface or a guiding curved surface, or the construction in which angle-shaped guiding ribs which become downward inclinations to the direction of the inside of a vehicle from the rear wall to the bottom wall are set at least in two or more locations at a proper distance therebetween along the width direction (the same direction as the traveling direction of the vehicle) is conceivable.

Therefore, with the pocket structure in a slide door according to the present invention, the storing capacity of the pocket can be enlarged to the depth side by forming a substantially lower portion of the pocket back cover to bulge to the vehicle body panel side, removal of small articles can be facilitated, and the cleaning operation on the occasion of cleaning the inside of the pocket can be easily performed.

Further, since the guide structure which becomes the downward inclination to the direction of the inside of a vehicle is adopted in the bottom portion of the door pocket, books slide along the guiding inclined surface, the guiding curved surface or the guiding ribs on the occasion of housing the books such as a road map, a magazine and the like in the pocket through the pocket opening, whereby the books such as a road map, a magazine and the like can be stored in the pocket in the substantially vertical posture. Accordingly, when the books such as a road map, a magazine and the like are stored in the door pocket, the books do not fall inside, and therefore, there is no problem of hindering the slide operation of the slid door.

As described above, since in the pocket structure in a slide door according to the present invention, the substantially lower half portion of the pocket back cover mounted to the rear surface side of the pocket opening provided in the door lining is formed to bulge to the vehicle body panel side, the depth space of the lower portion side of the pocket can be secured to be large, thus providing the effects of facilitating removal of small articles and of making it possible to perform a cleaning operation in the pocket smoothly.

Further, when the books such as a road map, a magazine and the like are stored in the door pocket, the lower edge of the books are guided to the front side along the guide inclined surface, the guide curved surface or the guide ribs, and the books are stored in the substantially vertical posture. Therefore, the upper ends of the books do not interfere with the vehicle body outer plate at the time of a slid operation of the slide door, and therefore, the effect of making it possible to expect reliable housing performance of the books while securing smooth operability of the slide door is provided.

DETAILED DESCRIPTION OF THE PREFERRED EMBODIMENTS

Embodiments of a pocket structure in a slide door according to the present invention will be described in detail below with reference to the accompanying drawings.

Embodiment 1

Figure 1:
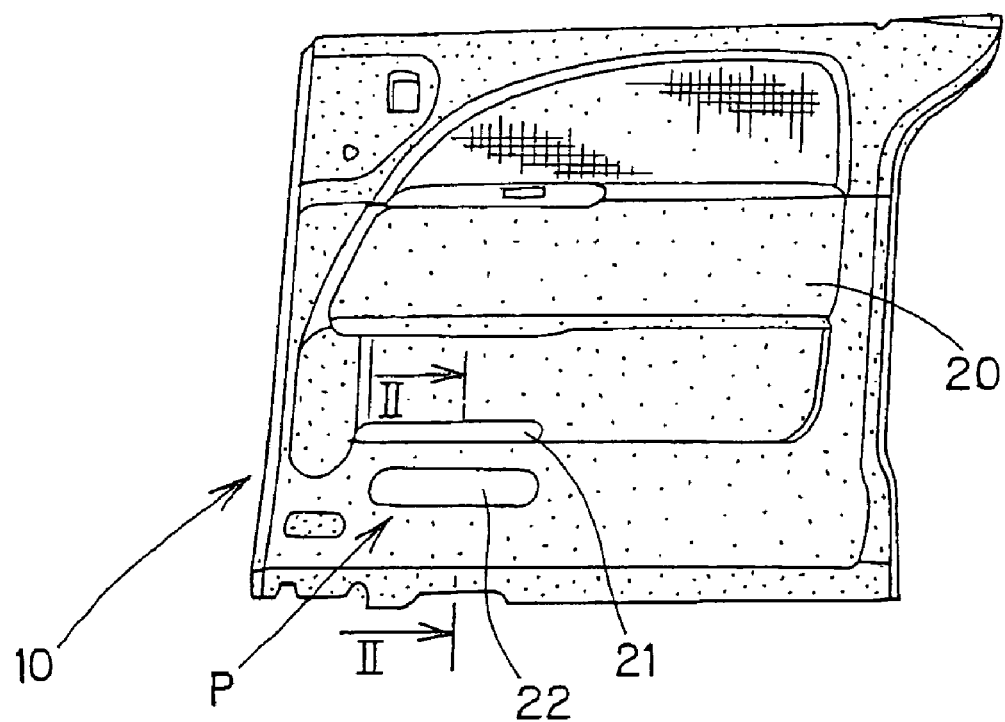
FIG. 1 is a front view showing a door lining to which a pocket structure according to the present invention is applied.
Figure 2:
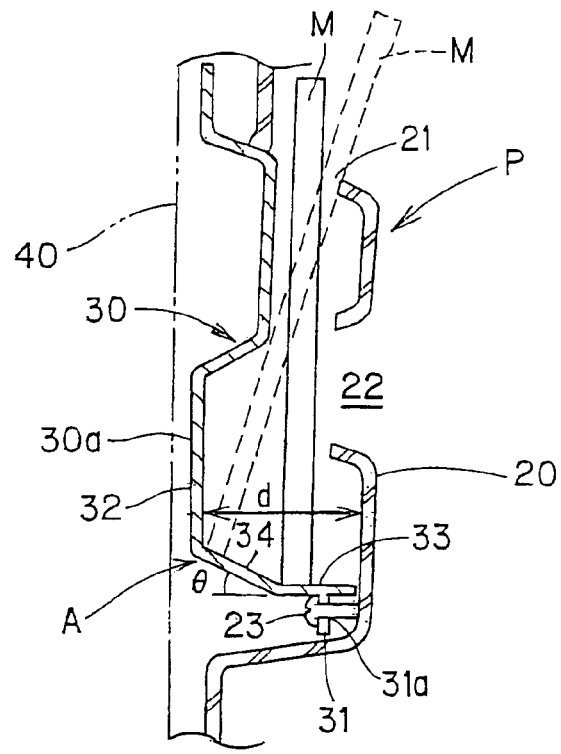
FIG. 2 is a sectional view taken along the line II—II in FIG. 1 showing a first embodiment of the pocket structure according to the present invention.
Figure 3:
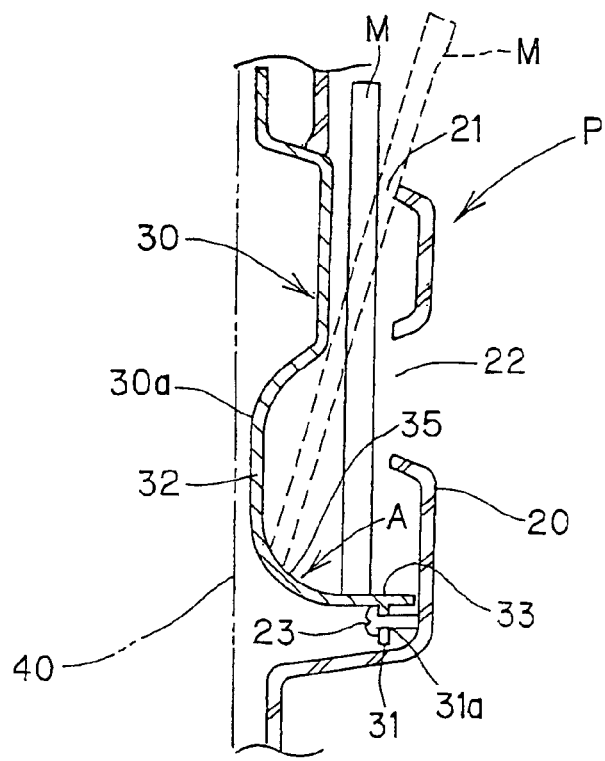
FIG. 3 is a sectional view showing a modification example of the pocket structure shown in FIG. 2.

FIG. 1 to FIG. 3 show a first embodiment of a door pocket structure according to the present invention, FIG. 1 is a front view of a door lining, FIG. 2 is a sectional view showing a door pocket structure in the same door lining, and FIG. 3 is a sectional view showing a modification example of the door pocket structure in the same door lining.

Figure 6:
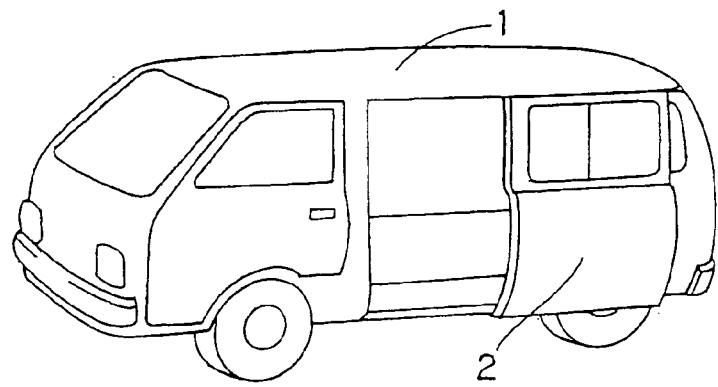
FIG. 6 is an exterior view showing a van type vehicle including a slide door.
Figure 7:
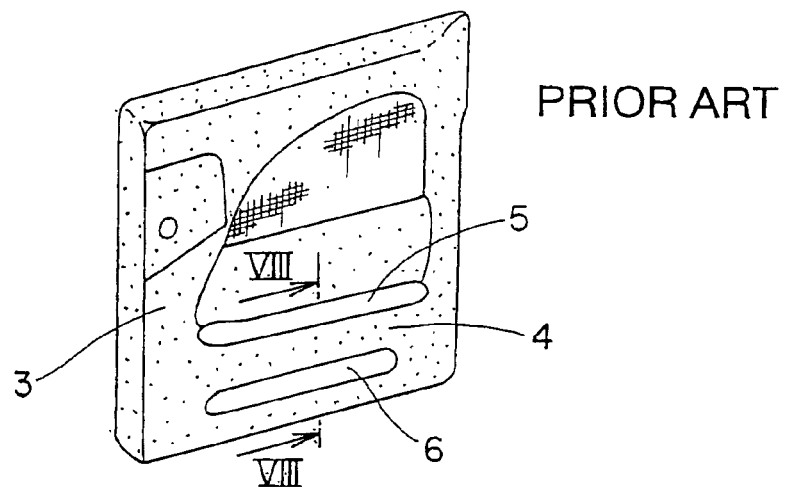
FIG. 7 is a perspective view showing a door lining which is mounted to a conventional slide door.
Figure 8:
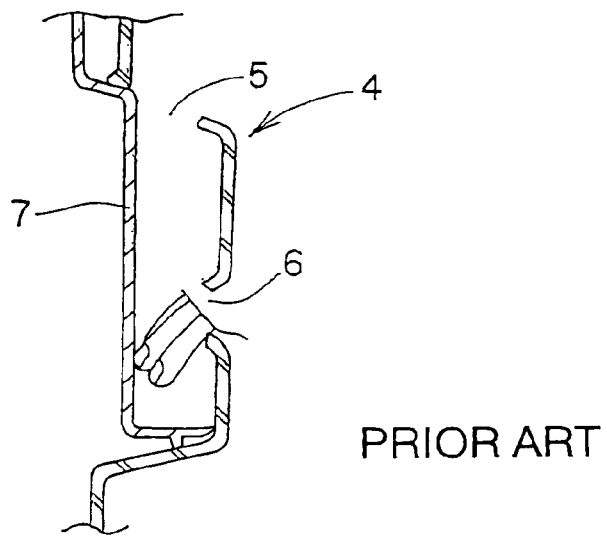
FIG. 8 is a sectional view showing a construction of a door pocket provided in the door lining which is mounted to the conventional slide door.

A door lining 10 shown in FIG. 1 is mounted to an indoor surface side of the slide door 2 of the van type vehicle 1 in FIG. 6 described in the prior art example. The door lining 10 is constructed by providing various kinds of functional components on a door lining main body 20, the door lining main body 20 is formed into a desired curved surface shape by an injection molding method, or mold press forming method with a general purpose synthetic resin such as a polypropylene (PP) resin, a polyethylene (PE) resin, an ABS resin and the like as a material. Since the dimension by which the door lining main body projects to the indoor side is restrained so that it does not interfere with the vehicle body outer plate facing it at the time of a slide operation of the slide door 2, the shape of the door lining main body 20 is set to form a substantially flat shape.

The present invention is especially characterized in the structure of a door pocket P in the door lining 10. Namely, a pocket opening 21 is provided at a lower portion side of the door lining main body 20, with a small articles removing window part 22 provided below the pocket opening 21, and a pocket back cover 30 is mounted to rear surface sides of the door pocket opening 21 and the small articles removing window part 22.

The pocket back cover 30 is formed into a desired curved surface shape by injection-molding a synthetic resin such as a polypropylene (PP) resin, a polyethylene (PE) resin, an ABS resin and the like. As a mounting structure of the pocket back cover 30, a mounting boss 23 is projectingly provided at a back surface of the door lining main body 20, then the mounting boss 23 is inserted into a mounting hole 31a provided at a flange 31 of the pocket back cover 30, and a tip end is crimped by ultrasonic welding, thermal welding or the like, or fitting a fixture such as a bush nut or the like from a tip end side of the mounting boss 23, whereby the pocket back cover 30 can be mounted to the door lining main body 20.

Incidentally, the characteristic of the present invention lies in addition of a scheme to a shape of a substantially lower half part 30a of the pocket back cover 30, and by placing a rear wall 32 of the pocket back cover 30 close to a door inner panel 40 so that the substantially lower half part 30a bulges to the door inner panel 40 side, the depth space of the door pocket P is secured to be large, and a guiding inclined surface 34 is set at a back side of a bottom wall 33 of the pocket back cover 30 so that an inclined angle (shown by a reference character θ in the drawing) becomes 15° or more. Reference character d in FIG. 2 shows a depth dimension at the lower side of the door pocket P. Accordingly, since the pocket space of the door pocket P, especially, the depth space d at the lower side is secured to be large, small articles can be easily removed through the small articles removing window part 22, and a cleaning operation of the inside of the door pocket P can be easily performed through the small articles removing window part 22.

Further, on the occasion of storing books M such as a road map, a magazine and the like in the door pocket P, for example, if the bottom wall 33 of the pocket back cover 30 is a flat surface, there is the tendency that the books M are stored in the inclined postures, and on that occasion, upper ends of the books interfere with the vehicle body outer plate at the time of opening the slide door. However, since the guiding inclined surface 34 is set as this embodiment, the books M are guided along the guiding inclined surface 34 from the dotted-line position to be stored in the vertical state shown by the solid line, and therefore, the books M can be reliably stored without interfering with the vehicle outer plate at the time of a slide operation of the slide door 2.

Next, FIG. 3 shows a modification example of the pocket back cover 30, and instead of the guiding inclined surface 34, a guiding curved surface 35 is set. The guiding curved surface 35 is formed from the rear wall 32 in the pocket back cover 30 to the bottom wall 33, and the guiding curved surface 35 is provided so that the inner surface side of the pocket back cover 30 becomes a curved recessed surface.

In the case of the guiding curved surface 35 as above, the books M are guided to keep the vertical postures along the guiding curved surface 35 on the occasion of storing the books M such as a road map, a magazine and the like in the door pocket P, and especially in the case of adopting the guiding curved surface 35, joint portions with the rear wall 32 and the bottom wall 33 are inconspicuous, and therefore, favorable touch is obtained on the occasion of inserting fingers into the pocket, in addition to which, the advantage of further facilitating a cleaning operation of the inside of the door pocket P is provided.

Embodiment 2

Figure 4:
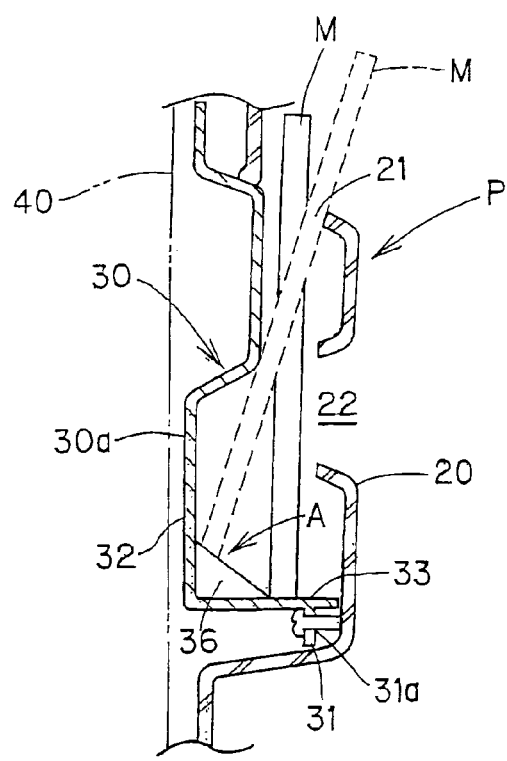
FIG. 4 is a sectional view showing a second embodiment of the pocket structure according to the present invention.
Figure 5:
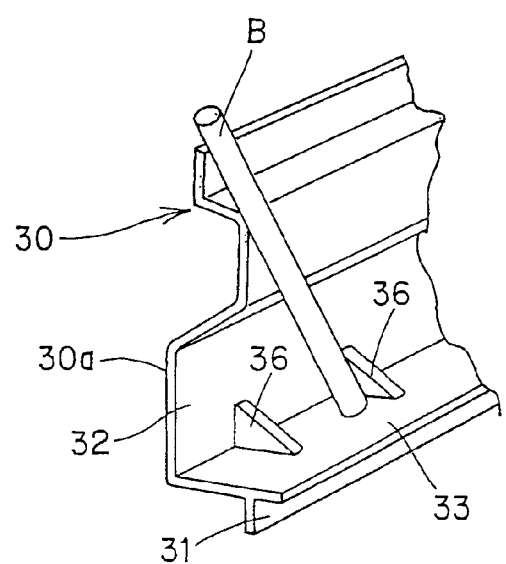
FIG. 5 is a perspective view showing a pocket back cover used for the pocket structure shown in FIG. 4.

FIGS. 4 and 5 show a second embodiment of the door pocket P according to the present invention, FIG. 4 is a sectional view showing a construction of the door pocket P, and FIG. 5 is a perspective view showing an essential part of a pocket back cover adopted in the same door pocket P. Note that the constructions of the door lining 10 and the door lining main body 20 are the same as in the first embodiment, and therefore, the detailed explanation will be omitted by assigning them with the same reference numerals.

In the second embodiment, the pocket opening 21 small in the depth dimension is also provided in the door lining main body 20, and the small articles removing window part 22 is provided below the pocket opening 21.

The shape of the pocket back cover 30 which is mounted to the rear surface side of the pocket opening 21 and the small articles removing window part 22 is the same as that in the first embodiment in the point that the substantially lower half part 30a is formed into a bulged shape so that the rear wall 32 of the substantially lower half part 30a is located at the position close to the door inner panel 40, but in the second embodiment, an angle-shaped guiding rib 36 is integrated from the rear wall 32 to the bottom wall 33 instead of the guiding inclined surface 34 and the guiding curved surface 35 in the first embodiment.

Therefore, as shown in FIG. 4, the same operational effect as that of the first embodiment that small articles can be easily removed through the small articles removing window part 22 and a cleaning operation is facilitated by securing the depth space at the lower portion side of the door pocket P to be large; and on the occasion of storing the books M such as a road map, a magazine and the like, the books M stored at the dotted line position are along the guiding rib 36 and restrained in the stored postures to a vertical state, thus exerting no adverse effect on the operation of the slide door 2 without interference of the vehicle outer plate and the books M at the time of opening and closing operations of the slide door 2 can be expected.

Further, in the second embodiment, the guiding rib 36 performs a reinforcing function, and therefore, rigidity of the pocket back cover 30 can be intensified, thus making it possible to enhance durability of the door pocket P and making it possible to secure a larger space between the guiding ribs 36 as compared with the guiding inclined surface 34 and the guiding curved surface 35 of the first embodiment. In addition, as shown in FIG. 5, on the occasion of housing a rod-shaped body B such as a ball-point pen and the like in the door pocket P, if the rod-shaped body B is stood against the guiding rib 36, the guiding rib 36 is used conveniently for storing the rod-shaped body B such as a ball-point pen and the like. Note that the guiding rib 36 is set to be the angle shape in the second embodiment, but the same effect can be expected if the inclined edge portion is changed to the curved shape.

The construction in which the separate pocket back cover 30 is mounted to the door lining main body 20 by crimping, mechanical fixation or the like is adopted in both the first and the second embodiments, but the structure in which the door lining main body 20 and the pocket back cover 30 are integrally formed to be foldable via a hinge part can be adopted. Besides, in the first embodiment, the guiding inclined surface 34 or the guiding curved surface 35 is integrally formed at the part of the bottom wall 33 of the pocket back cover 30, but a separate angle may be set to the flat bottom wall 33 in the post-process.

What is claimed is:

1. A pocket structure in a slide door for a vehicle essentially consisting of a door lining which is mounted to an indoor surface side of a slide door, said door lining including a lining main body and being formed to be substantially flat so as to avoid interference with a vehicle body panel at a time of a slide operation of the slide door; a door pocket which is provided with a pocket opening at the lining main body; and a pocket back cover which is mounted to a rear surface side of the pocket opening,
   wherein a bottom of said door pocket is provided with a guide structure, said guide structure being inclined downward to the direction of the inside of a vehicle so as to store books in the door pocket in substantially vertical posture; and a lower part of said pocket back cover is formed to bulge to a vehicle body panel side so as to secure a space of a lower portion of the door pocket to be large.

2. The pocket structure in a slide door for a vehicle according to claim 1, wherein said guide structure is provided with a guiding inclined surface which is inclined downward to the direction of the inside of a vehicle or a guiding curved surface at a back side portion of the bottom wall of the pocket back cover.

3. The pocket structure in a slide door for a vehicle according to claim 1, wherein said guide structure is provided with an angle-shaped guiding rib in an area from a rear wall of the pocket back cover to the bottom wall.

* * * * *